United States Patent [19]
Kim et al.

[11] Patent Number: 5,820,658
[45] Date of Patent: Oct. 13, 1998

[54] APPARATUS AND METHOD FOR PROCESSING EXHAUST GAS

[75] Inventors: Hee-Duk Kim; Byoung-Hyo Jung, both of Suwon, Rep. of Korea

[73] Assignee: Samsung Electronics Co., Ltd., Suwon, Rep. of Korea

[21] Appl. No.: 775,768

[22] Filed: Dec. 31, 1996

[30] Foreign Application Priority Data

Jun. 26, 1996 [KR] Rep. of Korea ...................... 96-24194

[51] Int. Cl.[6] .................................................. B01D 49/00
[52] U.S. Cl. ................................ 95/288; 55/261; 55/264; 55/267
[58] Field of Search ........................... 55/261, 264, 265, 55/267, 319, 320, 326, 331, 257.1; 95/268, 288, 273, 211, 216

[56] References Cited

U.S. PATENT DOCUMENTS

| | | | |
|---|---|---|---|
| 2,910,136 | 10/1959 | Valliant et al. | 55/320 |
| 3,592,122 | 7/1971 | Hughes | 55/264 |
| 3,596,440 | 8/1971 | Nutter et al. | 55/320 |
| 3,605,386 | 9/1971 | Erwin et al. | 55/264 |
| 3,687,630 | 8/1972 | Tailor | 55/265 |
| 3,955,945 | 5/1976 | Bauer | 55/319 |
| 4,014,671 | 3/1977 | Andro et al. | 55/331 |
| 4,325,716 | 4/1982 | Livemore | 55/265 |
| 4,479,809 | 10/1984 | Johnson et al. | 55/261 |
| 4,529,423 | 7/1985 | Johnson et al. | 55/320 |
| 5,409,514 | 4/1995 | Ragusa et al. | 55/319 |

*Primary Examiner*—Duane S. Smith
*Attorney, Agent, or Firm*—Jones & Volentine, L.L.P.

[57] ABSTRACT

An apparatus and a method for eliminating moisture or fumes contained in the exhaust gas more efficiently. The apparatus has a diffusion cup disposed in a diffusion chamber contained in a housing of the apparatus. The housing has a gas inflow sleeve, a gas exhaust tube and a drain pipe connected to the bottom of the housing. In the apparatus, the exhaust gas introduced through the gas inflow sleeve into the housing collides with the diffusion cup and is diffused throughout the diffusion chamber, decreasing the temperature of the gas. Thereafter, nitrogen gas is sprayed at high pressure forcing the exhaust gas out of the diffusion chamber. Impurities, including moisture, fumes, and the like contained in the exhaust gas are quickly eliminated, thereby preventing corrosion of the duct work in the system. Therefore, costs for maintaining the apparatus can be subsequently reduced and environmental pollution can be efficiently prevented.

12 Claims, 3 Drawing Sheets

APPARATUS AND METHOD FOR PROCESSING EXHAUST GAS

BACKGROUND OF THE INVENTION

1. Field of the Invention

The present invention relates to an apparatus and a method for processing exhaust gas, and more particularly to an apparatus and a method for eliminating moisture or fumes completely from the exhaust gas resulting from a gas scrubber system operating on exhaust products from a liquid source.

2. Description of the Prior Art

In various steps of semiconductor device manufacturing processes such as oxidation, diffusion, and chemical vapor deposition (CVD), various kinds of chemicals are usually processed in a gaseous state and then exhausted out of the manufacturing system. However, such chemicals exhausted in a gaseous state can cause environmental pollution. Therefore, the exhaust gas containing such chemicals is required to be purified before being exhausted into the environment.

FIGS. 1 and 2 schematically depict a conventional apparatus for processing exhaust gas. The conventional apparatus of FIG. 1 includes a scrubber 1. The exhaust gas exhausted from various systems (not shown) dedicated to a semiconductor device manufacturing line is introduced through an introduction tube 1a, and is then purified by the scrubber. The exhaust gas purified by the scrubber 1 is transferred through an exhaust tube 1b and collected in a main duct 2, and then exhausted out from the main duct.

As depicted in FIG. 2, the scrubber 1 houses an absorbing layer 3, a plurality of nozzles 4, and a demister 5. The absorbing layer first absorbs water contained in the exhaust gas introduced through the introduction tube 1a. Then, the nozzles 4 disposed above the absorbing layer spray cleaning solution onto the exhaust gas, which has passed above the absorbing layer, so as to secondarily clean the exhaust gas. The demister 5 is disposed above the nozzles 4 and filters off moisture and the like from the exhaust gas.

In the conventional apparatus as described above, most of the impurities in the exhaust gas are filtered out while the exhaust gas introduced into the scrubber 1 passes through the absorbing layer 3. Then, the cleaning solution is sprayed onto the exhaust gas by the nozzles 4. Thereafter, moisture contained in the exhaust gas is eliminated by the demister 5 while the exhaust gas passes through the demister 5. The purified exhaust gas is discharged through the exhaust tube 1b. Impurities precipitated in the lower part of the scrubber 1 are drained through the drain tube 1c to a waste water disposal system (not shown).

However, the scrubber 1 of the conventional apparatus uses a wet-type technique. In particular, the demister 5 employs a simple method of lowering the temperature or the dew point of the exhaust gas to eliminate moisture or fumes from the exhaust gas. As a result, the conventional device can not completely eliminate the moisture or fumes contained in the exhaust gas.

Since a substantial amount of moisture remains in the exhaust gas, the main duct 2 is apt to become corroded. In practice, the main duct 2 must be replaced more than once every other year. In addition, the conventional apparatus does not appreciably prevent environmental pollution.

SUMMARY OF THE INVENTION

Accordingly it is an object of the present invention to provide an apparatus and method for eliminating moisture or fumes contained in exhaust gas more efficiently.

A further object of the present invention is to provide an apparatus and a method for more efficient elimination of atmospheric pollutants.

It is an additional object of the present invention to eliminate costly and time-consuming replacement of portions of exhaust gas treatment systems.

To achieve these and other objects, the present invention provides an apparatus for eliminating moisture and fumes contained in exhaust gas used in a semiconductor device manufacturing line. The apparatus includes a housing with a gas inflow sleeve, a gas exhaust sleeve, and a drain pipe. The exhaust gas is introduced through the gas inflow sleeve into the housing and exhausted through the gas exhaust sleeve. The drainpipe enables waste water to be drained from the apparatus. A first means is used for diffusing the exhaust gas introduced into the housing so as to increase the volume of the exhaust gas, thereby lowering the temperature of the exhaust gas. A second means is used for spraying a predetermined gas onto the exhaust gas exhausted from the first means, so as to further lower the temperature of the exhaust gas. A dust collector is used for filtering off moisture and other impurities contained in the exhaust gas liquified by the first and second means.

Another embodiment of the present invention provides a method for processing exhaust gas. The method includes a first step of introducing the exhaust gas into a housing, the exhaust gas containing moisture and fumes resulting from a semiconductor device manufacturing line. In the next step, the temperature of the exhaust gas is lowered by diffusing the exhaust gas in a diffusion chamber defined in the housing and thereby increasing the volume of the exhaust gas. In the next step, the temperature of the exhaust gas is lowered further by spraying a predetermined gas onto the exhaust gas exhausted out of the diffusion chamber. Then, dust including moisture and fumes from the exhaust gas liquified through the temperature lowering steps is filtered out. Finally the dust filtered in the filtering step is removed through a drain pipe, and the purified exhaust gas is discharged through an exhaust tube.

DETAILED DESCRIPTION OF PREFERRED EMBODIMENTS

Figure 1:
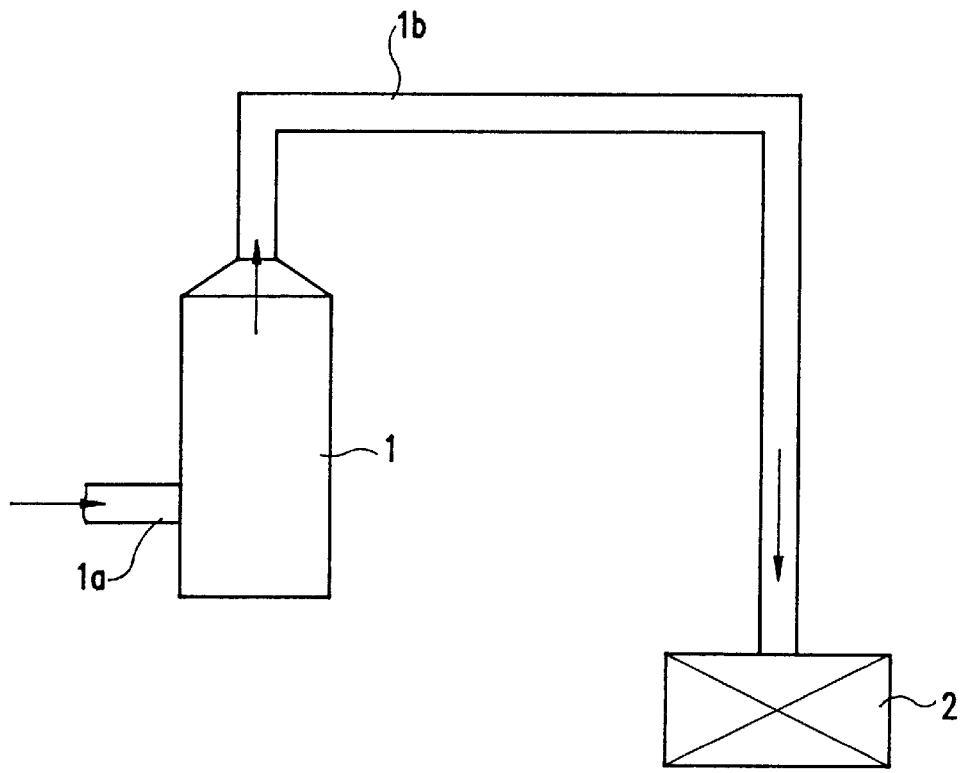
FIG. 1 is a schematic diagram depicting a conventional apparatus for processing exhaust gas.
Figure 2:
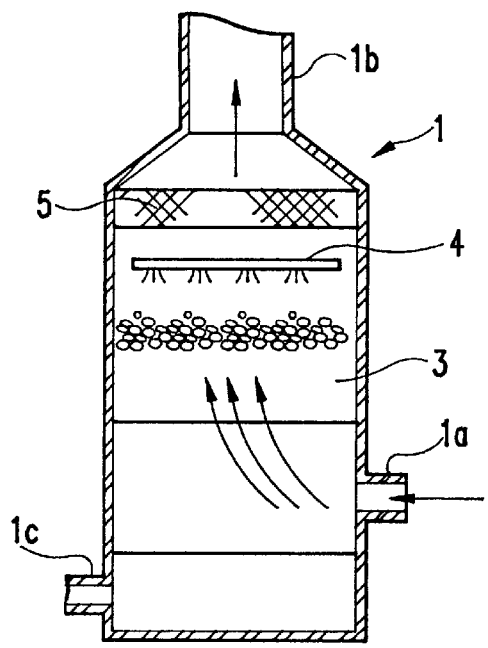
FIG. 2 is a sectional view of a scrubber of the conventional apparatus shown in FIG. 1.
Figure 3:
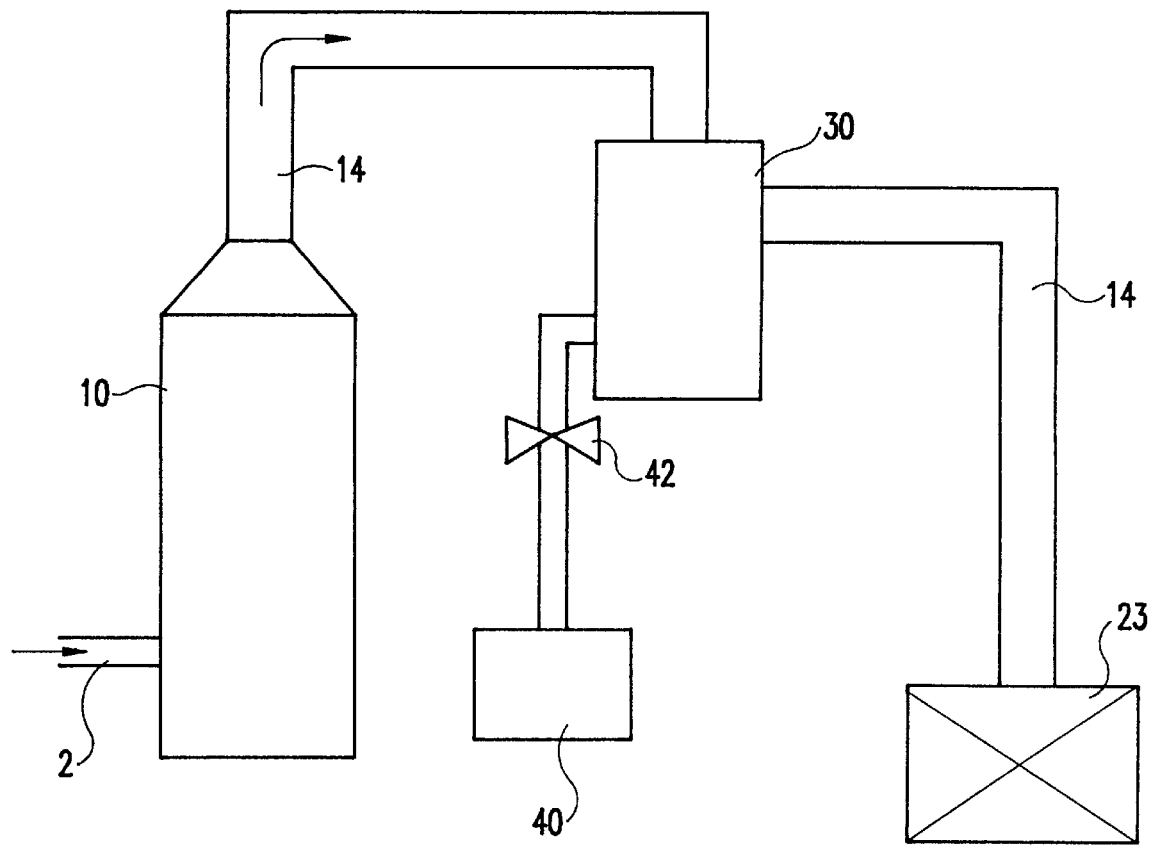
FIG. 3 is a schematic diagram of an apparatus for processing exhaust gas according to the present invention.
Figure 4:
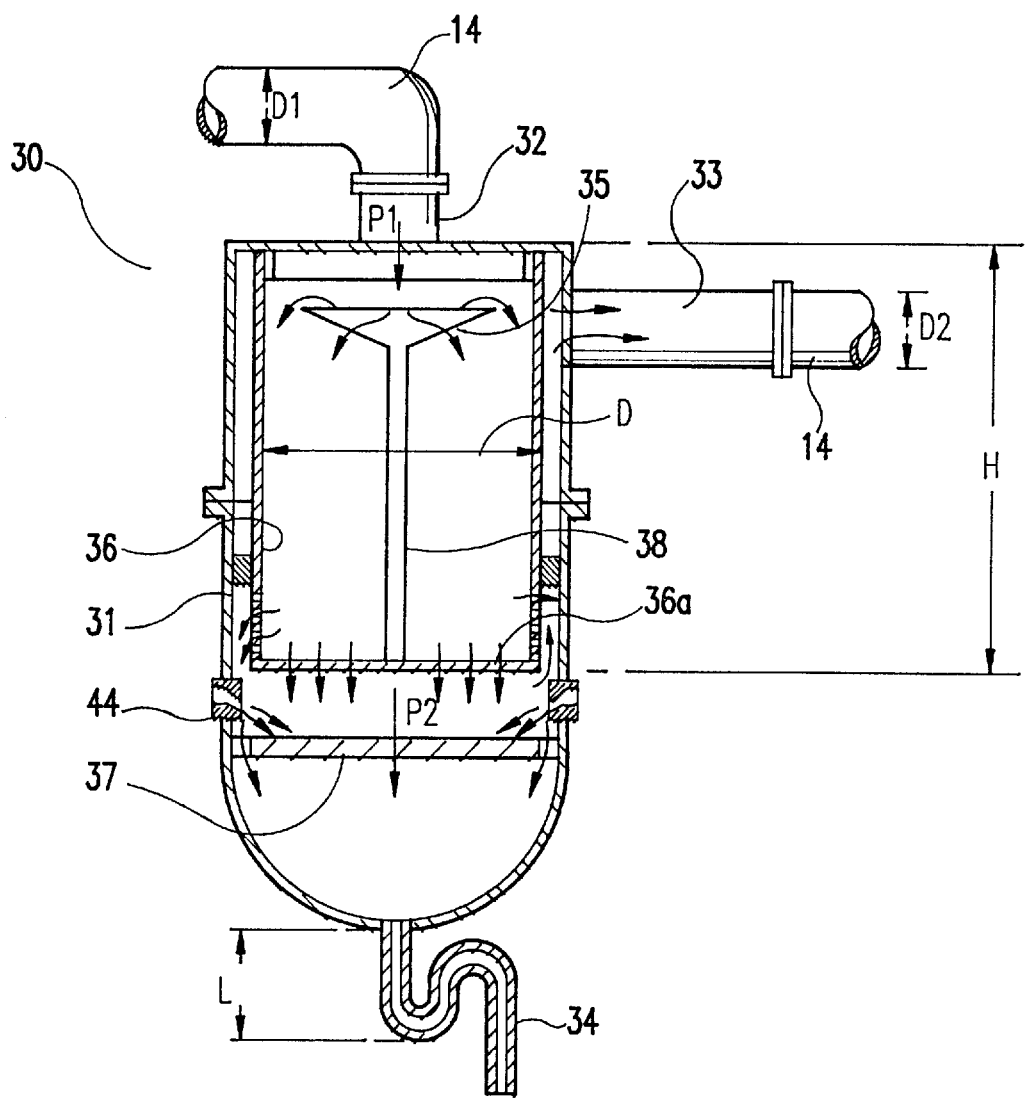
FIG. 4 is a partial sectional view of a dryer of the apparatus shown in FIG. 3.

FIG. 3 is a schematic diagram depicting the construction of an apparatus for processing exhaust gas according to the present invention, and FIG. 4 is a partial sectional diagram of a dryer 30, or an apparatus for eliminating moisture and fumes, employed in the apparatus shown in FIG. 3.

As depicted in FIG. 3, the apparatus includes a scrubber 10 and a dryer 30. The scrubber 10 purifies the exhaust gas which is exhausted from various systems (not shown) in the manufacturing line and introduced to the scrubber through an input tube 12. The dryer 30 is disposed in the middle of an exhaust tube 14 of the scrubber, and operates to eliminate moisture or fumes contained in the exhaust gas. The dryer 30 is connected to a drying gas supplier 40 for supplying gas, such as nitrogen (N$_2$) and the like, to the dryer by means of a control valve 42. The exhaust tube is connected to a main duct 20, and the exhaust gas purified by the scrubber 10 is transferred through the exhaust tube 14 and collected in the main duct 20. The exhaust gas is then exhausted out from the main duct 20.

The scrubber 10 houses the same elements and has the same construction as that of the above described conventional devices. Accordingly the description thereof will be omitted.

As depicted in FIG. 4, the dryer 30 includes a cylindrical housing 31, a gas inflow sleeve 32, and a gas exhaust sleeve 33 respectively connected to the exhaust tube 14. The gas inflow sleeve 32 and the gas exhaust sleeve 33 are respectively connected to the upper center and the upper lateral portions of the housing 31. The dryer 30 further includes a drain pipe 34 connected to the bottom center of the housing 31. The moisture or fumes collected at the bottom of the housing 31 is drained as waste water through the drain pipe 34.

The housing 31 includes a cylindrical diffusion chamber 36 disposed at the upper part of the interior of the housing 31 and connected to the gas inflow sleeve 32. The diffusion chamber 36 functions as a first temperature dropping device for lowering the temperature of the exhaust gas introduced in the housing 31. A plurality of pores 36a are formed at the bottom and the lower lateral portion of the diffusion chamber 36 at regular intervals.

A support column 38 is fixed to the bottom center of the diffusion chamber 36 and extends vertically upwards. A conical diffusion cup 35 is mounted on the upper end of the support column 38 and is arranged opposite the gas inflow sleeve 32. The mouth of the diffusion cup 35 has an area which is larger than that of the cross-section of the gas inflow sleeve 32, so that the exhaust gas introduced through the gas inflow sleeve 32 will collide with the interior of the diffusion cup 35, and be diffused.

Preferably, the sum nA of the cross-sectional areas of all the pores 36a is equal to the cross-sectional area $A_1$ of the gas inflow sleeve 32, or the cross-sectional area $A_2$ of the gas exhaust sleeve 33, so that the exhaust gas can flow smoothly. It is also preferable that the diameter D of the diffusion chamber 36 be three times that of the diameter $D_1$ of the gas inflow sleeve 32. Also, the height H of the diffusion chamber 36 should be one and one-half times that of diameter D of the diffusion chamber 36.

A plurality of nozzles 44 are disposed along the lower periphery of the housing 31 and near the bottom of the diffusion chamber 36. The nozzles 44 spray nitrogen gas at high pressure, and are declined inward and downward, so that the sprayed gas will not collide directly with the exhaust gas passing through the pores 36a. As a result, the nitrogen spray will not disturb the flow of the exhaust gas or generate a reverse pressure. Preferably, the declination angle of the nozzles 44 is 6°, and the nozzles 44 employ the jet type sprays in order to increase the acceleration of the nitrogen gas.

A dust collector 37 having the shape of a plate is disposed under the housing 31. The dust collector 37 filters off moisture, fumes, chemicals, and other impurities contained in the exhaust gas liquified by the action of the diffusion chamber 36 and the nozzles 44.

A drain pipe 34 is connected to the bottom of the housing 31. Preferably, the drain pipe 34 is a double-bent U-shaped tube, so as to prevent generation of a counter pressure and to enable the natural draining of the waste water without stagnation. To ensure this, the height L of the drain pipe from the housing to the first bend must have a fluid pressure head larger than ΔP, where ΔP is the difference between the introduction pressure P1 and the exhaust pressure P2 of the exhaust gas, and is expressed as ΔP=|P2 −P1|.

When using the present invention, the exhaust gas exhausted from various systems (not shown) in the manufacturing line is transferred through the scrubber 10 into the dryer 30. The exhaust gas introduced through the gas inflow sleeve 32 into the housing 31 collides with the diffusion cup 35 and is diffused in the diffusion chamber 36. Therefore, the exhaust gas expands and the volume of gas is increased. As a result the temperature, or the dew point, of the exhaust gas falls. According to the above-described technique, moisture, fumes, and the like contained in the exhaust gas is first liquified and then separated by the decreasing temperature of the exhaust gas.

Thereafter, nitrogen gas supplied from the drying gas supplier 40 is sprayed at high pressure through the nozzles 44 to the exhaust gas passing through the pores 36a of the diffusion chamber 36. Then, the pressure around the exhaust gas is lowered, and thereby the dew point of the exhaust gas is artificially lowered. Also, the nitrogen gas dilutes the exhaust gas. As a result, the moisture, fumes, and the like contained in the exhaust gas are completely liquified by the second decrease in the temperature of the exhaust gas.

Because of the above-mentioned first and second temperature-lowering steps, a part of the liquified moisture, fumes, and other impurities become attached to the dust collector 37, and the other part thereof flows to the bottom of the housing 31 and is drained through the drain pipe 34.

The purified exhaust gas is transferred through the gas exhaust sleeve 33 and the exhaust tube 14 and collected in the main duct 20. Since the diameter $D_2$ of the gas exhaust sleeve 33 is narrower than the diameter D of the diffusion chamber 36, the flowing speed of the exhaust gas passing through the gas exhaust sleeve 33 is increased and thereby the dew point of the gas is elevated. As a result, the very small amount of moisture which is not drained through the drain pipe 34, but which remains in the exhaust gas flowing through the gas exhaust sleeve 33, can be dried because the relative humidity of the exhaust gas is elevated. Accordingly, corrosion of the exhaust tube 14 and the main duct 20 is prevented. Therefore, the cost for maintaining the apparatus can be reduced. Moreover, environmental pollution can be prevented efficiently.

While the present invention has been particularly shown and described with reference to the particular embodiments thereof, it will be understood by those skilled in the art that various changes in form and details may be effected therein without departing from the spirit and scope of the invention. Accordingly, the invention should be considered to include any and all configurations, modifications, variations, combinations, equivalent arrangements or expansions falling within the scope of the following claims.

What is claimed is:

1. An apparatus for eliminating moisture and fumes contained in exhaust gas comprising:

a housing including a gas inflow sleeve for introducing exhaust gas into said housing, a gas exhaust sleeve for exhausting said exhaust gas out of the housing, and a drain pipe for draining waste water from the housing;

first means for diffusing the exhaust gas introduced into the housing so as to increase volume of the exhaust gas, thereby lowering temperature of the exhaust gas;

second means for spraying a predetermined gas under positive pressure onto the exhaust gas exhausted from the first means, so as to further lower temperature of the exhaust gas; and a dust collector for filtering out moisture and other impurities contained in the exhaust gas liquified by the first means and the second means.

2. The apparatus as claimed in claim 1, wherein said first means comprises a conical diffusion cup disposed in an upper part of a diffusion chamber, the diffusion chamber disposed at an upper part of an interior of said housing and interconnected to said gas inflow sleeve, the diffusion chamber comprising a plurality of pores formed at a bottom and lower lateral portion of said diffusion chamber at regular intervals, the diffusion cup having a mouth with an area larger than that of said gas inflow sleeve, so that said exhaust gas introduced through said gas inflow sleeve collides with an interior of said diffusion cup and becomes diffused.

3. The apparatus as claimed in claim 2, wherein a sum of cross-sectional areas of the pores is equal to a cross-sectional area of the gas inflow sleeve and to a cross-sectional area of the gas exhaust sleeve.

4. The apparatus as claimed in claim 2, wherein the diffusion chamber has a diameter which is three times that of a diameter of the gas inflow sleeve.

5. The apparatus as claimed in claim 2, wherein the diffusion chamber has a height which is one and one-half times that of a diameter of the diffusion chamber.

6. The apparatus as claimed in claim 1, wherein said second means for spraying comprises a plurality of nozzles disposed along a lower periphery of the housing at regular intervals, and arranged to spray the predetermined gas at high pressure.

7. The apparatus as claimed in claim 6, wherein said nozzles decline inwardly, so that the predetermined gas sprayed from the nozzles does not collide directly with the exhaust gas passing through the pores, whereby the predetermined gas does not disturb flow of the exhaust gas and generate a reverse pressure.

8. The apparatus as claimed in claim 6, wherein said predetermined gas sprayed by the nozzles is nitrogen.

9. The apparatus as claimed in claim 1, wherein said drain pipe has a double-bent U-shape, so as to prevent generation of a counter pressure and to enable a natural drain of the waste water without stagnation.

10. The apparatus as claimed in claim 9, wherein said drain pipe has a fluid pressure head larger than a difference between an introduction pressure and an exhaust pressure of the exhaust gas.

11. A method for processing exhaust gas, said method comprising the steps of:

(1) introducing the exhaust gas containing moisture and fumes into a housing;

(2) lowering temperature of the exhaust gas by diffusing the exhaust gas in a diffusion chamber defined in the housing and thereby enlarging a volume of the exhaust gas;

(3) secondarily lowering the temperature of the exhaust gas by spraying a predetermined gas under positive pressure onto gas exhausted out of the diffusion chamber so that pressure around the exhaust gas is lowered;

(4) filtering off dust including moisture and fumes from the exhaust gas liquified through steps 2 and 3; and (5) draining the dust filtered in step 4 through a drain pipe and discharging purified exhaust gas through an exhaust tube.

12. The method as claimed in claim 11, wherein step 5 further comprises the step of elevating the temperature of exhaust gas by changing flowing speed of the exhaust gas, so that a small amount of moisture which is not drained through the drain pipe but contained in the exhaust gas flowing through the exhaust tube can be dried.

* * * * *